United States Patent
Dal Pra'

(10) Patent No.: US 8,302,504 B2
(45) Date of Patent: Nov. 6, 2012

(54) BICYCLE BOTTOM BRACKET ASSEMBLY

(75) Inventor: Giuseppe Dal Pra', Zane (IT)

(73) Assignee: Campagnolo S.r.l., Vicenza (IT)

( * ) Notice: Subject to any disclaimer, the term of this patent is extended or adjusted under 35 U.S.C. 154(b) by 1027 days.

(21) Appl. No.: 11/704,861

(22) Filed: Feb. 9, 2007

(65) Prior Publication Data

US 2007/0204722 A1 Sep. 6, 2007

(30) Foreign Application Priority Data

Feb. 20, 2006 (EP) .................................. 06003423

(51) Int. Cl.
*B62M 3/00* (2006.01)
*F16C 9/00* (2006.01)
*F16C 13/00* (2006.01)

(52) U.S. Cl. .................. 74/594.1; 384/458; 384/545

(58) Field of Classification Search .............. 74/594.1, 74/594.2; 384/458, 545; 280/210, 256, 259, 280/260

See application file for complete search history.

(56) References Cited

U.S. PATENT DOCUMENTS

| | | | |
|---|---|---|---|
| 529,110 A | 11/1894 | Copeland | |
| 535,706 A | 3/1895 | Luther | |
| 590,695 A | 9/1897 | Alcorn | |
| 593,562 A | 11/1897 | Brennan | |
| 594,109 A | 11/1897 | Weed et al. | |
| 596,846 A | 1/1898 | Brown | |
| 602,049 A | 4/1898 | Beard | |
| 648,077 A | 4/1900 | Ludlow | |
| 658,624 A | 9/1900 | Egger | |
| 846,239 A | 3/1907 | Osborne | |
| 951,137 A | 3/1910 | Lowrance | |
| 1,235,530 A | 7/1917 | Jones | |
| 1,449,235 A | 3/1923 | Lewis | |
| 2,136,125 A | 11/1938 | Delaval-Crow | |
| 3,306,101 A | 2/1967 | Holderer | |
| 3,347,112 A | 10/1967 | Thun | |
| 3,578,829 A | 5/1971 | Hata et al. | |

(Continued)

FOREIGN PATENT DOCUMENTS

CN 1522929 8/2004

(Continued)

OTHER PUBLICATIONS

Isis Drive Standard Committee, (Copyright 2001), *The International Spline Interface Standard*, (18 pgs.).

(Continued)

*Primary Examiner* — James Pilkington
(74) *Attorney, Agent, or Firm* — Volpe and Koenig, P.C.

(57) ABSTRACT

A bicycle bottom bracket assembly has a shaft having a longitudinal axis extending along a predetermined direction and a first and second end portion. A first bearing has an inner ring inserted on the shaft in a position adjacent to the first end portion and an outer ring is coupled with a first adapter adapted to be associated with a first end of a housing box of the bottom bracket assembly in a bicycle frame. A second bearing has an inner ring inserted on the shaft adjacent to the second end portion and an outer ring coupled with a second adapter is associated with a second end of the housing box. The assembly further includes first locking means of the inner rings of the first and second bearings acting on the inner rings to prevent the movement of the inner rings in both ways of the predetermined direction.

41 Claims, 5 Drawing Sheets

U.S. PATENT DOCUMENTS

| | | | |
|---|---|---|---|
| 3,888,136 A * | 6/1975 | Lapeyre | 74/594.1 |
| 3,906,811 A | 9/1975 | Thun | |
| 4,093,325 A | 6/1978 | Troccaz | |
| 4,208,763 A | 6/1980 | Schroder | |
| 4,300,411 A | 11/1981 | Segawa | |
| 4,331,043 A * | 5/1982 | Shimano | 74/594.2 |
| 4,406,504 A | 9/1983 | Coenen et al. | |
| 4,704,919 A | 11/1987 | Durham | |
| 4,810,040 A | 3/1989 | Chi | |
| 5,067,370 A * | 11/1991 | Lemmens | 74/594.2 |
| 5,243,879 A * | 9/1993 | Nagano | 74/594.2 |
| 5,493,937 A | 2/1996 | Edwards | |
| 5,624,519 A | 4/1997 | Nelson et al. | |
| 5,819,600 A | 10/1998 | Yamanaka | |
| 5,907,980 A * | 6/1999 | Yamanaka | 74/594.1 |
| 5,984,528 A | 11/1999 | Ohtsu | |
| 6,014,913 A | 1/2000 | Yamanaka | |
| 6,116,114 A | 9/2000 | Edwards | |
| 6,192,300 B1 | 2/2001 | Watarai et al. | |
| 6,443,033 B1 | 9/2002 | Brummer et al. | |
| 6,564,675 B1 | 5/2003 | Jiang | |
| 6,581,494 B2 | 6/2003 | Sechler | |
| 6,790,535 B2 | 9/2004 | Nishimura et al. | |
| 6,829,965 B1 | 12/2004 | Mombrinie | |
| 6,886,676 B2 | 5/2005 | Von Levern et al. | |
| 6,938,516 B2 * | 9/2005 | Yamanaka | 74/594.1 |
| 6,983,672 B2 | 1/2006 | Smith | |
| 7,258,041 B2 | 8/2007 | Yamanaka et al. | |
| 7,267,030 B2 * | 9/2007 | French | 74/594.1 |
| 7,503,239 B2 | 3/2009 | Yamanaka | |
| 7,798,724 B2 | 9/2010 | Van De Sanden et al. | |
| 2001/0015390 A1 | 8/2001 | Hitomi et al. | |
| 2002/0081052 A1 | 6/2002 | Chi | |
| 2002/0096015 A1 | 7/2002 | Smith | |
| 2003/0006113 A1 * | 1/2003 | Terada et al. | 192/45 |
| 2003/0097901 A1 | 5/2003 | Yamanaka | |
| 2004/0162172 A1 | 8/2004 | Yamanaka et al. | |
| 2005/0011304 A1 | 1/2005 | Chiang | |
| 2005/0016323 A1 | 1/2005 | Dal Pra' | |
| 2005/0040699 A1 | 2/2005 | Chiang et al. | |
| 2005/0081678 A1 | 4/2005 | Smith et al. | |
| 2005/0217417 A1 | 10/2005 | Uchida et al. | |
| 2006/0103106 A1 * | 5/2006 | Schlanger | 280/259 |
| 2006/0112780 A1 | 6/2006 | Shiraishi et al. | |
| 2006/0288819 A1 | 12/2006 | Dal Pra' et al. | |
| 2007/0137426 A1 | 6/2007 | Meggiolan et al. | |
| 2007/0151410 A1 | 7/2007 | Meggiolan | |
| 2007/0207631 A1 | 9/2007 | Meggiolan et al. | |
| 2007/0283781 A1 | 12/2007 | Meggiolan | |
| 2008/0124018 A1 | 5/2008 | Tanke et al. | |
| 2009/0145262 A1 | 6/2009 | Pasqua et al. | |
| 2009/0261553 A1 | 10/2009 | Meggiolan | |
| 2011/0049834 A1 | 3/2011 | Natu | |

FOREIGN PATENT DOCUMENTS

| | | |
|---|---|---|
| DE | 1 257 613 | 12/1967 |
| DE | 23 59 437 | 6/1975 |
| DE | 297 15 373 U 1 | 8/1998 |
| DE | 200 03 398 | 5/2000 |
| EP | 0 756 991 A2 | 8/1996 |
| EP | 0 924 318 | 6/1999 |
| EP | 1 120 336 | 8/2001 |
| EP | 1 314 902 | 5/2003 |
| EP | 1 342 656 A2 | 9/2003 |
| EP | 1 342 656 A3 | 9/2003 |
| EP | 1 449 760 A2 | 8/2004 |
| EP | 1 659 057 | 5/2006 |
| EP | 1 661 803 | 5/2006 |
| EP | 1 726 517 | 11/2006 |
| EP | 1726518 A1 | 11/2006 |
| EP | 1 759 981 A2 | 3/2007 |
| EP | 1 759 981 A3 | 3/2007 |
| EP | 1 792 821 | 6/2007 |
| EP | 1792818 A1 | 6/2007 |
| EP | 1 820 726 | 8/2007 |
| FR | 0 623 094 | 6/1927 |
| FR | 863 610 | 4/1941 |
| FR | 0 934 104 | 5/1948 |
| FR | 2 801 863 | 6/2001 |
| FR | 2 870 508 | 11/2005 |
| GB | 2315776 | 2/1998 |
| JP | 57-128585 | 8/1982 |
| JP | 05319349 | 12/1993 |
| JP | 09104383 | 4/1997 |
| JP | 11225633 | 8/1999 |
| JP | 2000-289677 | 10/2000 |
| JP | 2003-261087 | 9/2003 |
| JP | 2004-106838 | 4/2004 |
| JP | 2004-249770 | 9/2004 |
| JP | 2004-275193 | 10/2004 |
| JP | 2005-001663 | 1/2005 |
| JP | 2005-053410 | 3/2005 |
| WO | 01/63134 | 8/2001 |
| WO | 02/32751 A2 | 4/2002 |
| WO | 2005-009832 | 2/2005 |
| WO | 2005/058682 | 6/2005 |

OTHER PUBLICATIONS

"A Folding MWB Two-Wheeled Recumbent", Nick Abercrombie Andrews. Human Power, spring-summer 1994, 11(2), pp. 18-21. http://web.archive.org/web/20050210021901/http://pardo.net/bike/pic/fail-005/000.html.
English translation of Oct. 27, 2010 Office Action issued in corresponding Chinese Appln. No. 20070085427.6.
European Search Report (EP08425259), Oct. 21, 2008.
Oct. 25, 2011 Office Action issued in Japanese Appln. No. 2006-326959.
English translation of Oct. 25, 2011 Office Action issued in Japanese Appln. No. 2006-326959
Japanese Office Action and English translation for Application No. 2007-118028—Issued on Feb. 28, 2012.
Japanese Office Action and English translation for Application No. 2007-037411—Issued on Feb. 28, 2012.

* cited by examiner

BICYCLE BOTTOM BRACKET ASSEMBLY

FIELD OF INVENTION

The present invention relates to a bicycle bottom bracket assembly.

BACKGROUND

As known, a bicycle bottom bracket assembly comprises a shaft and two crank arms associated with the opposite ends of the shaft. The shaft can be made in a distinct piece from the crank arms or can be made in a single piece with one of the two crank arms.

The component of the bicycle bottom bracket assembly consisting of a crank arm and a shaft coupled together or made in a single piece is typically identified with the expression "crank arm assembly."

The bottom bracket assembly is mounted on the bicycle by housing the shaft in a housing box suitably provided in the bicycle frame. The rotation of the bottom bracket assembly with respect to the housing box is achieved by inserting a pair of rolling bearings onto the shaft. Each bearing is positioned on the shaft at a respective shaft body portion adjacent to the crank arm. When the bottom bracket assembly is mounted on the bicycle frame, each bearing is operatively arranged between the shaft and the housing box suitably provided in the frame.

Typically, the mounting system of the bearings on the shaft is configured so that the bearings, once mounted on the shaft, can provide a precise reference for the correct positioning of the bottom bracket assembly in the housing box provided in the bicycle frame and can allow possible variations in size of such a box and/or possible dilations of the shaft to be accommodated without compromising the correct positioning of the bottom bracket assembly with respect to the bicycle frame. However, the known bottom bracket assemblies are difficult to assemble and/or are not strong enough to resist high loads during exercise.

SUMMARY

The present invention relates, in a first aspect thereof, to a bicycle bottom bracket assembly, comprising:

a shaft having a longitudinal axis X-X extending along a predetermined direction and comprising a first end portion and a second end portion;

a first bearing having a first ring inserted onto the shaft in a position adjacent to the first end portion and a second ring coupled with a first adapter adapted to be associated with a first end of a housing box of the bottom bracket assembly in a bicycle frame;

a second bearing having a first ring inserted onto the shaft in a position adjacent to the second end portion and a second ring coupled with a second adapter adapted to be associated with a second end of the housing box; and first locking means of the first rings of the first and second bearings acting on the first rings to prevent the movement of the first rings in both ways of the predetermined direction;

wherein at least one adapter of the first and second adapters comprises a first abutment surface adapted to operate in abutment against a front end surface of the housing box and a second abutment surface adapted to operate in abutment against the second ring of at least one bearing between the first and second bearings and wherein the second ring of the other bearing is free to move with respect to the other adapter in both ways of the predetermined direction.

BRIEF DESCRIPTION OF THE DRAWING(S)

Further characteristics and advantages of the present invention shall become clearer from the following detailed description of some preferred embodiments thereof, made with reference to the attached drawings. In these drawings.

DETAILED DESCRIPTION OF THE PREFERRED EMBODIMENT(S)

Figure 1:
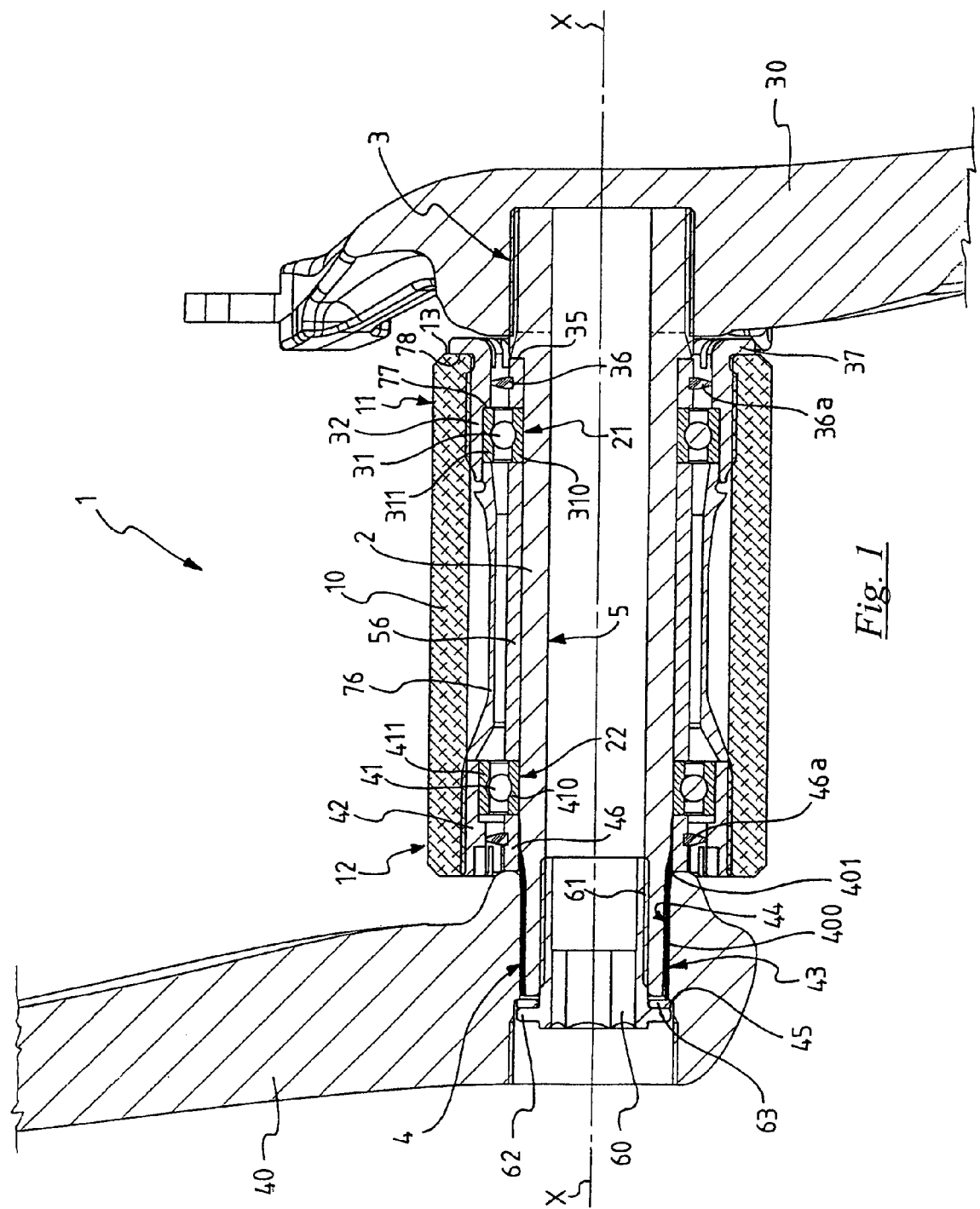
FIG. 1 is a schematic view in longitudinal section of a first embodiment of a bicycle bottom bracket assembly in accordance with the present invention.

Advantageously, in the bottom bracket assembly of the present invention the bearings are both locked with respect to the shaft so as not to compromise the correct positioning of the crank arms with respect to the middle plane of the bicycle frame and the freedom of movement of the second ring of at least one bearing allows possible errors, even of substantial degree, in the size of the housing box and/or dilations of the shaft to be recovered. Indeed, the free ring makes the position of the bearing with respect to the shaft independent of the position of the bearing with respect to the adapter. In general, the adapters are made from light material, such as aluminum alloy, and their walls are thin and therefore elastic. Accordingly, the translation of the ring that is free with respect to the adapter is easy and requires a low effort.

Preferably, the first ring is the inner ring of the bearing and the second ring is the outer ring of the bearing.

Preferably, the bottom bracket assembly of the present invention further comprises:

a first crank arm coupled with the first end portion of the shaft;

a second crank arm coupled with the second end portion of the shaft;

wherein at least one of the first and second crank arms is axially mobile with respect to the shaft along the predetermined direction and can be locked on the respective end portion of shaft in a predetermined axial position in which the at least one of the first and second crank arms exerts an axial thrust on at least one of the first rings along the predetermined direction to lock at least one of the first and second bearings in axial position with respect to the shaft.

Advantageously, in the bottom bracket assembly of the present invention, the locking of at least one bearing in the desired axial position on the shaft is achieved by simply utilizing the thrusting action exerted on the at least one bearing by the crank arm that is axially mobile along the respective end portion of the shaft and lockable in a predetermined axial position. The mounting of such a bearing on the shaft is therefore quick and easy since it simply requires the coupling of the bearing on the shaft and the axial movement of the crank arm with respect to the shaft to lock the bearing in position on the shaft. The bottom bracket assembly of the present invention does not require any forced coupling between bearing and shaft. The shaft of the assembly of the present invention is therefore, advantageously, not stressed.

Even more advantageously, the mounting of the bottom bracket assembly in the housing box provided in the bicycle frame is quick and easy because the coupling between the shaft and the crank arm can be seen by the operator since it is outside the housing box provided in the bicycle frame.

Preferably, the first crank arm is coupled with the first end portion of shaft through a first shape coupling that allows a relative movement between the first crank arm and the first end portion of shaft along the predetermined direction. Advantageously, the shape coupling between the bearing and the shaft involves low stresses on the shaft.

In a first preferred embodiment of the bottom bracket assembly of the present invention, the first shape coupling is a grooved coupling, for example, like the one described in European Patent Application No. 05425377 to the same applicant (which is the priority application to U.S. patent application Ser. No. 11/442,864, filed May 30, 2006, published as U.S. Patent Application Publication No. US2006/0288819-A1), incorporated herein by reference as if fully set forth with respect to the portion in which such a type of coupling is described. Preferably, the grooved coupling is of the type with rectilinear generatrices parallel to the axis of the shaft and of the coupling hole of the crank arm, as described below.

In a second preferred embodiment of the bottom bracket assembly of the present invention, the first shape coupling is a coupling with square faces.

Preferably, the first locking means comprise a first abutment element fixed with respect to the shaft and acting on at least one of the first rings on the opposite side to the first crank arm to lock the at least one of the first rings in axial position on the shaft. Advantageously, the abutment element provides a counteraction to the axial thrust exerted on the bearing by the crank arm which is movable along the respective end portion of shaft, thus ensuring the locking in position of such a bearing on the shaft.

In a particularly preferred embodiment of the bottom bracket assembly of the present invention, the first abutment element is defined by a shoulder integrally formed on the shaft. Advantageously, the counteraction to the axial thrust of the crank arm on the bearing is obtained without the need to use additional elements such as elastic rings or similar elements.

Alternatively, the first abutment element can be defined by a front end surface of the second crank arm. Advantageously, in this case it is not necessary to provide any shoulder on the shaft, thus making it simpler to manufacture.

Preferably, the first locking means further comprise a first spacer inserted on the shaft between the first and second bearing and acting in abutment on the first rings of the first and second bearing and wherein the first abutment element is defined at the second end portion of the shaft and is active on the first ring of the second bearing on the opposite side to the first spacer to lock the first rings of the first and second bearings in axial position on the shaft. Advantageously, the locking in position of both of the bearings on the shaft can be achieved through the axial thrust exerted on both bearings by a single crank arm that can be moved axially on the respective end portion of shaft. Moreover, the spacer arranged between the two bearings covers outwardly the central portion of the shaft, which is thus stiffened against the bending stress to which the shaft is typically subjected during pedaling.

In the aforementioned preferred embodiments of the bottom bracket assembly of the present invention, the second crank arm can be integrally formed with the shaft, or coupled with the shaft through a forced interference coupling, or even coupled with the shaft through a second shape coupling identical to the first coupling described above with reference to the coupling between the first crank arm and the respective end portion of shaft, i.e., a coupling that allows a relative movement between the second crank arm and the second end portion of the shaft along the predetermined direction.

In a particular embodiment in which the second crank arm is coupled with the second end portion of the shaft through a shape coupling, the first abutment element is defined at the first end portion of the shaft and is active on the first ring of the first bearing on the opposite side to the first crank arm to lock the first bearing in axial position on the shaft and the first locking means also comprise a second abutment element formed on the shaft at the second end portion of the shaft and active on the first ring of the second bearing on the opposite side to the second crank arm to lock the second bearing in axial position on the shaft. In this case, the locking in position of each bearing on the shaft is achieved through the axial thrust exerted on such bearing by a respective crank arm that can be moved axially on the respective end portion of the shaft.

In a first preferred embodiment of the bottom bracket assembly of the present invention, the adapters are adapted to be housed inside the housing box. Preferably, in this case, the bottom bracket assembly of the present invention comprises second locking means of the second ring of the at least one bearing acting on the second ring to prevent the movement of the second ring in both ways of the predetermined direction. Advantageously, the locking of the second ring of a bearing against the movement in both ways of the predetermined direction prevents axial stresses greater than those normally foreseen during pedaling from being able to move the shaft with respect to the housing box provided in the bicycle frame and provides a precise reference for the mounting of the bottom bracket assembly in the aforementioned box.

More preferably, the second locking means comprise the second abutment surface and a second spacer active in abutment on the second ring on the opposite side to the at least one adapter, the second spacer being thrust against the second ring by the other adapter. Advantageously, the use of a second spacer thrust into abutment against the outer ring of a bearing by the adapter coupled with the other bearing ensures the possibility of achieving the locking of the outer ring of the bearing even in the presence of possible errors in size of the housing box. Indeed, the position of the spacer is not influenced by such errors, nor does it determine the position of the other bearing, which is free to move due to dilations of the shaft.

Preferably, the at least one adapter comprises a flange on which the first abutment surface is defined. Such a flange cooperates with the abutment surface for the outer ring of the bearing locked in position on the shaft to determine the position of the bottom bracket assembly with respect to the housing box provided in the bicycle frame.

In a second preferred embodiment of the bottom bracket assembly of the present invention, the adapters are adapted to be mounted cantilevered on the housing box. Preferably, in this case, the bottom bracket assembly of the present invention comprises third locking means of the second ring of the at least one bearing acting on the second ring to prevent the movement of the second ring along the predetermined direction towards the inside of the housing box. Advantageously, the locking of the second ring of one of the two bearings in one of the two ways of the predetermined direction provides the reference for the positioning of the bottom bracket assembly in the housing box provided in the bicycle frame, whereas the freedom of movement of the second ring of the other bearing in the two ways of the predetermined direction allows errors in size of the housing box to be recovered.

Preferably, the third locking means comprise the abutment surface for the second ring.

In a further preferred embodiment of the bottom bracket assembly of the present invention, the shaft comprises a central body portion having a diameter greater than that of the first and second end portions. Such a shaft, advantageously, has a high resistance to the bending stresses to which it is subjected during pedaling.

In a second aspect thereof, the present invention therefore relates to a bicycle crank arm assembly, comprising:

a shaft having a longitudinal axis X-X extending along a predetermined direction and comprising at least one end portion for coupling with a crank arm;

at least one crank arm comprising a coupling hole with the end portion of the shaft, the hole having a longitudinal axis X-X extending along the predetermined direction;

wherein the end portion of the shaft and the coupling hole comprise respective coupling profiles of matching shape;

wherein the coupling profiles are defined by respective coupling elements extending parallel to the longitudinal axis X-X.

Advantageously, the mutual coupling profiles of the shaft and of the crank arm are therefore profiles with rectilinear and parallel generatrices, which are much simpler to make, and therefore more cost-effective, with respect to the tapered profiles currently known. Even more advantageously, the use of profiles with rectilinear and parallel generatrices allows the axial position of the crank arm with respect to the shaft to be chosen freely, for example making use of spacing washers.

The shaft of the crank arm assembly mentioned above can be a piece of the shaft of the bottom bracket assembly (which in this case shall consist of two distinct pieces coupled together) or the same shaft of the bottom bracket assembly (which in this case shall consist of a single piece).

Preferably, the coupling profiles are grooved profiles and the coupling elements comprise a plurality of crests and a plurality of grooves defined on the end portion of the shaft and in the coupling hole of the crank arm.

Even more preferably, the crests and grooves are defined by joined curved surfaces, according to what is described in European Patent Application No. 05425377.8 to the same applicant (which is the priority application to U.S. patent application Ser. No. 11/442,864, filed May 30, 2006, published as U.S. Patent Application Publication No. US2006/0288819-A1), incorporated herein by reference as if fully set forth. This type of grooved profile is particularly advantageous in cases in which it must be made on components having unidirectional structural fibers, like for example in the case in which the crank arm is made from composite material, since the absence of sharp edges and deep grooves minimizes the possibility of breaking or damaging the aforementioned unidirectional structural fibers.

Preferably, the grooves formed on the shaft comprise a tapered axially inner portion. This allows a larger abutment surface to be made on the shaft for the bearing or for possible spacer elements arranged between bearing and abutment surface.

In a third aspect thereof, the present invention relates to a shaft of a bicycle bottom bracket assembly, comprising a body having a longitudinal axis X-X extending along a predetermined direction, the body having an end portion for coupling with a crank arm, wherein the end portion of the shaft comprises a coupling profile defined by coupling elements extending parallel to the longitudinal axis X-X.

In a fourth aspect thereof the present invention relates to a bicycle crank arm, comprising a body having a hole for coupling with a shaft of a bicycle bottom bracket assembly, the coupling hole having a longitudinal axis X-X extending along a predetermined direction, wherein the coupling hole comprises a coupling profile defined by coupling elements extending parallel to the longitudinal axis X-X.

Such a shaft and such a crank arm can advantageously be used in the crank arm assembly and in the bottom bracket assembly described above.

Moreover, the applicant has studied how to manufacture a shaft of a bottom bracket assembly that has a higher strength and at the same time is lighter than those conventionally used.

In a fifth aspect thereof, the present invention therefore relates to a shaft of a bicycle bottom bracket assembly, comprising a first body having a longitudinal axis X-X extending along a predetermined direction, the first body comprising a first layer of material, wherein it comprises at least one second layer of material distinct from and lying over the first layer of material.

Advantageously, the applicant has found that such a shaft has a higher strength and at the same time is lighter than conventional single-layer shafts used in the prior art. The higher structural strength is due to the fact that the stratification makes the shaft more elastic and therefore more resistant to fatigue. The greater lightness, on the other hand, is due to the fact that, for the same strength, a two-layer shaft can be manufactured providing a thickness for each layer such that the sum of the thicknesses of the two layers is less than the thickness of the single layer of conventional shafts used in the prior art.

Such a shaft can advantageously be used in the crank arm assembly and in the bottom bracket assembly described above.

Advantageously, the outer layer of the shaft can act as a spacer for the bearings inserted onto the shaft.

Preferably, the first and at least one second layers are made from the same material. More preferably, the first body is substantially cylindrical and the at least one second layer of material defines at least one second substantially cylindrical body coaxially arranged outside the first body.

The applicant has also studied a new way of protecting the bearings of a bottom bracket assembly from internal and external agents of the bicycle frame.

The applicant has therefore identified a bottom bracket assembly provided with a system for the protection of the bearings from the external and internal agents of the bicycle frame that is easier to install compared to the one of the prior art discussed above.

The present invention therefore relates, in a further aspect thereof, to a bicycle bottom bracket assembly, comprising:

a shaft having a longitudinal axis X-X extending along a predetermined direction;

at least one bearing inserted on an end portion of the shaft;

an adapter coupled with the at least one bearing and adapted to be associated with a housing box of the bottom bracket assembly provided in a bicycle frame;

a first seal adapted to protect the at least one bearing from the external environment and operatively arranged between the adapter and the shaft;

wherein it comprises a second seal adapted to protect the at least one bearing from the inside of the housing box and operatively arranged between the adapter and the shaft.

Advantageously, such an assembly can be at least partially preassembled outside of the housing box provided in the bicycle frame. The positioning of the various components is therefore quick and easy and the assembly of the assembly and its mounting in the housing box provided in the frame is thus made easier.

The aforementioned seals are preferably used in the bottom bracket assembly of the present invention described above.

Preferably, the first and second seals are arranged at opposite sides with respect to the at least one bearing. Such seals thus cooperate with the adapter and with the shaft to create a substantially watertight chamber inside which the bearing is contained.

Preferably, the first seal comprises a first rigid ring coupled with a first annular element made from elastic material. The rigid ring has a support function whereas the elastic annular element (preferably made from rubber) ensures the seal and the insulation.

Preferably, the first annular element comprises a radially outer free end having a diameter slightly smaller than the diameter of the adapter and a radially inner free end in contact with the shaft.

Even more preferably, the radially inner free end of the first annular element is housed in an annular seat formed on the shaft.

In a specific embodiment, the first annular element further comprises an annular projection adapted to cooperate in abutment with a front wall of a crank arm. In this way, the coupling area between shaft and crank arm is also protected from the external environment, thus avoiding the possibility of corrosion phenomena occurring in this area.

Preferably, the first annular element comprises, at the radially outer free end, a fin that is placed on top of the first rigid ring and, at the radially inner free end, a curb, the first rigid ring being supported by the curb.

Preferably, the second seal comprises a second rigid ring coupled with a second annular element in elastic material.

More preferably, the second annular element comprises a radially outer free end in contact with the adapter and a radially inner free end having a diameter slightly larger than the diameter of the shaft.

Even more preferably, the radially outer free end of the second annular element is housed in an annular seat formed on the adapter.

Preferably, the second annular element comprises a sheath that, at a radially outer free end of the second annular element, at least partially covers the second rigid ring.

With reference to FIG. 1, a bicycle bottom bracket assembly in accordance with a first embodiment of the present invention is indicated with 1.

The assembly 1 comprises a shaft 2 having a longitudinal axis X-X extending along a predetermined direction. The shaft 2 comprises opposite end portions 3 and 4, right and left, respectively, with which a right crank arm 30 and a left crank arm 40 are respectively associated.

The shaft 2 is supported in rotation in a housing box 10 provided in the bicycle frame through the interposition of a right bearing 31 and of a left bearing 41 inserted onto the shaft 2. The box 10 is substantially cylindrical in shape and extends along a longitudinal axis intended to coincide with the axis X-X of the shaft 2 when such a shaft is housed inside the box 10.

In the specific embodiment illustrated in FIG. 1, the bearings 31 and 41 are ball bearings, but it is possible to use other types of bearings adapted to ensure a relative rotary motion between shaft 2 and box 10, such as for example roller bearings.

The bearings 31 and 41 are inserted in a right adapter 32 and in a left adapter 42 respectively. The adapters 32, 42 are screwed inside the box 10 at the opposite free end portions 11 and 12 of such a box 10.

In the assembled configuration thereof, the bearing 31 has an inner ring 310 coupled with a support portion 21 of shaft adjacent to the end portion 3 and an outer ring 311 coupled with an inner annular surface of the right adapter 32. Similarly, the bearing 41 has an inner ring 410 coupled with a support portion 22 of shaft adjacent to the end portion 4 and an outer ring 411 coupled with an inner annular surface of the left adapter 42.

The left crank arm 40 is coupled with the left end 4 of the shaft 2 through a shape coupling that allows a movement of the crank arm 40 with respect to the shaft 2 parallel to the axis X-X of the shaft 2. In the embodiment illustrated in FIG. 1, such a coupling is a grooved coupling, for example like the one described in European Patent Application No. 05425377 to the same applicant (which is the priority application to U.S. patent application Ser. No. 11/442,864, filed May 30, 2006, published as U.S. Patent Application Publication No. US2006/0288819-A1). Preferably, as illustrated in FIG. 1, the grooved coupling is defined, preferably, by forming in the left crank arm 40 a grooved hole 43 defined by coupling elements 400 (in particular crests and grooves preferably defined by joined curved surfaces) having rectilinear generatrices parallel to the axis X-X of the shaft 2 and, in the left end portion 4 of the shaft 2, a grooved surface 44 matching that of the hole 43. In the hole 43 an abutment element defined by a shoulder 45 is provided.

The grooves formed on the shaft comprise an axially inner portion 401 that has a tapering along the axis X-X. In such a portion, therefore, the depth of the grooves progressively decreases until it becomes zero.

The right crank arm 30, on the other hand, is associated with the right end portion 3 of the shaft 2 in a permanent manner, for example through forced coupling, through co-molding, or making it integrally formed with the shaft itself. In the example embodiment illustrated in FIG. 1, a forced coupling with interference of respective grooved profiles is shown.

However, alternative embodiments are foreseen in which the right crank arm 30 is coupled with the shaft 2 through a coupling that allows a relative movement between the crank arm 30 and the right end portion 3 of the shaft 2 along a direction parallel to the axis X-X of the shaft. Such a coupling can, for example, be of the type described above with reference to the coupling between the left crank arm 40 and the left end portion 4 of the shaft 2.

The locking of the left crank arm 40 on the left end portion 4 of the shaft 2 in a desired axial position is achieved through a screw 60 screwed into a threaded hole 61 made in the left end portion 4 of the shaft 2. The screw 60 is inserted into the hole 43 of the left crank arm 40 and has a head 62 intended to go into abutment against the shoulder 45 formed in the hole 43 of the left crank arm 40. Between the shoulder 45 and the head 62 of the screw 60 a washer 63 is arranged to improve the distribution of the tensions between screw 60 and left end portion 4 of the shaft 2.

As an alternative to the grooved coupling between the left crank arm 40 and the left end portion 4 of the shaft 2, it is possible to provide a coupling with square faces or a threaded coupling, like the one described in European Patent Application No. 05026302 to the same applicant (which is the priority application to U.S. patent application Ser. No. 11/586,863, filed Oct. 26, 2006). In any case, the left crank arm 40, by means of this coupling, must be able to move parallel to the axis X-X of the shaft 2.

Between the right end portion 3 and the left end portion 4 of the shaft 2, a central portion 5 of constant diameter is defined. The right end portion 3, on the other hand, is defined on a shaft body portion of greater diameter, so as to form on the shaft 2, at the right end portion 3 thereof, a shoulder 35, adapted to act as an abutment surface (possibly through the interposition of suitable spacers) for the inner ring 310 of the right bearing 31, as shall be described in greater detail hereafter.

In the embodiment illustrated in FIG. 1, between the inner ring 310 of the right bearing 31 and the inner ring 410 of the left bearing 41 a central spacer 56 is arranged. A right spacer 36 is then arranged between the shoulder 35 and the inner ring 310 of the right bearing 31 and a left spacer 46 is arranged between the inner ring 410 of the left bearing 41 and the left crank arm 40.

In the mounting step, with reference to the embodiment illustrated in FIG. 1, the operator screws the right adapter 32 onto the right end of the box 10 and inserts, in order, the right spacer 36, the right bearing 31, the central spacer 56, the left bearing 41, the left spacer 46, and the left crank arm 40 onto the shaft 2, from the left end thereof. At this point, the shaft 2 is inserted into the box 10 and the left adapter 42 is screwed onto the left end 12 of the box 10. The screw 60 is then tightened in the threaded hole 61 of the shaft 2. During the tightening of the screw 60, the crank arm 40 moves on the left end portion 4 of the shaft 2 pushing all of the aforementioned components towards the shoulder 35 formed on the shaft 2 at the right end portion 3 thereof. The clamping ends when the left crank arm 40 packs together the left spacer 46, the left bearing 41, the central spacer 56, the right bearing 31 and the right spacer 36 against the shoulder 35. It should be noted that for this to be possible, it is necessary for the spacers 36, 46, and 56 to be sized in such a way as to avoid the shoulder 45 formed in the left crank arm 40 going into abutment against the left front end face of the shaft 2. One skilled in the art shall understand that the size of the spacers depends upon the length of the shaft 2 and upon the width of the left crank arm 40, and that the presence of the right and left spacers 36, 46 is not necessary in the case in which the assembly 1 is sized so that the left crank arm 40 can go directly into abutment against the inner ring 410 of the left bearing 41 and the right bearing 31 can go directly into abutment against the shoulder 35 formed at the right end portion 3 of the shaft 2.

In an alternative embodiment that is not illustrated, the shaft 2 has a constant diameter along the entire longitudinal extension thereof. The shoulder 35 is therefore not provided and its function is carried out directly by the front end surface of the right crank arm 30, on which the right spacer 36 or directly the right bearing 31 goes into abutment.

When mounting is completed, the inner rings 310, 410 of the right and left bearings 31, 41 are locked in position on the shaft 2; i.e., any movement of such inner rings is prevented in both ways along a direction parallel to the axis X-X of the shaft 2.

The assembly 1 of FIG. 1 further comprises an outer spacer 76 substantially cylindrical in shape inserted outside the spacer 56 and having a longitudinal size such as to be able to be arranged in abutment between the left adapter 42 and the outer ring 311 of the right bearing 31. Such an outer ring 311, on the opposite side to the outer spacer 76, is in abutment against an abutment surface 77 formed on the right adapter 32. The outer ring 311 of the right bearing 31 is locked in position by the vice action exerted by the cooperation between the right adapter 32 and the outer spacer 76, which is thrust against the outer ring 311 by the left adapter 42. When mounting is completed, therefore, any movement of the outer ring 311 of the right bearing 31 is prevented in both ways along a direction parallel to the axis X-X of the shaft 2.

As illustrated in FIG. 1, the right adapter 32 has an end flange 37 having an end portion extending radially outwards and on which an abutment surface 78 adapted to operate in abutment against a right front end surface 13 of the box 10 is defined. Such a flange 37, together with the right bearing 31 having the inner ring 311 locked between the shoulder 35 and the spacer 56 and the outer ring 312 locked between the right adapter 32 and the outer spacer 76, unequivocally determines the position of the assembly 1 with respect to the box 10. Moreover, the locking of the right bearing 31 ensures the correct positioning of the assembly 1 inside the box 10 also in the case of axial overloading.

The left adapter 42, on the other hand, is sized so as to allow the outer ring 411 of the left bearing 41 to move in both ways of the direction parallel to the axis X-X of the shaft 2. The left adapter 42 is screwed onto the left end portion 12 of the box 10 until it thrusts the outer spacer 76 in abutment against the outer ring 311 of the right bearing 31, which in turn is in abutment against the abutment surface 77 formed in the right adapter 32.

The assembly 1 of FIG. 1 further comprises annular seals 36a, 46a arranged between the adapters 32, 42 and the spacers 36, 46 in a position axially outside the bearings 31, 41 to protect such right and left bearings 31, 41 from the external environment.

Figure 2:
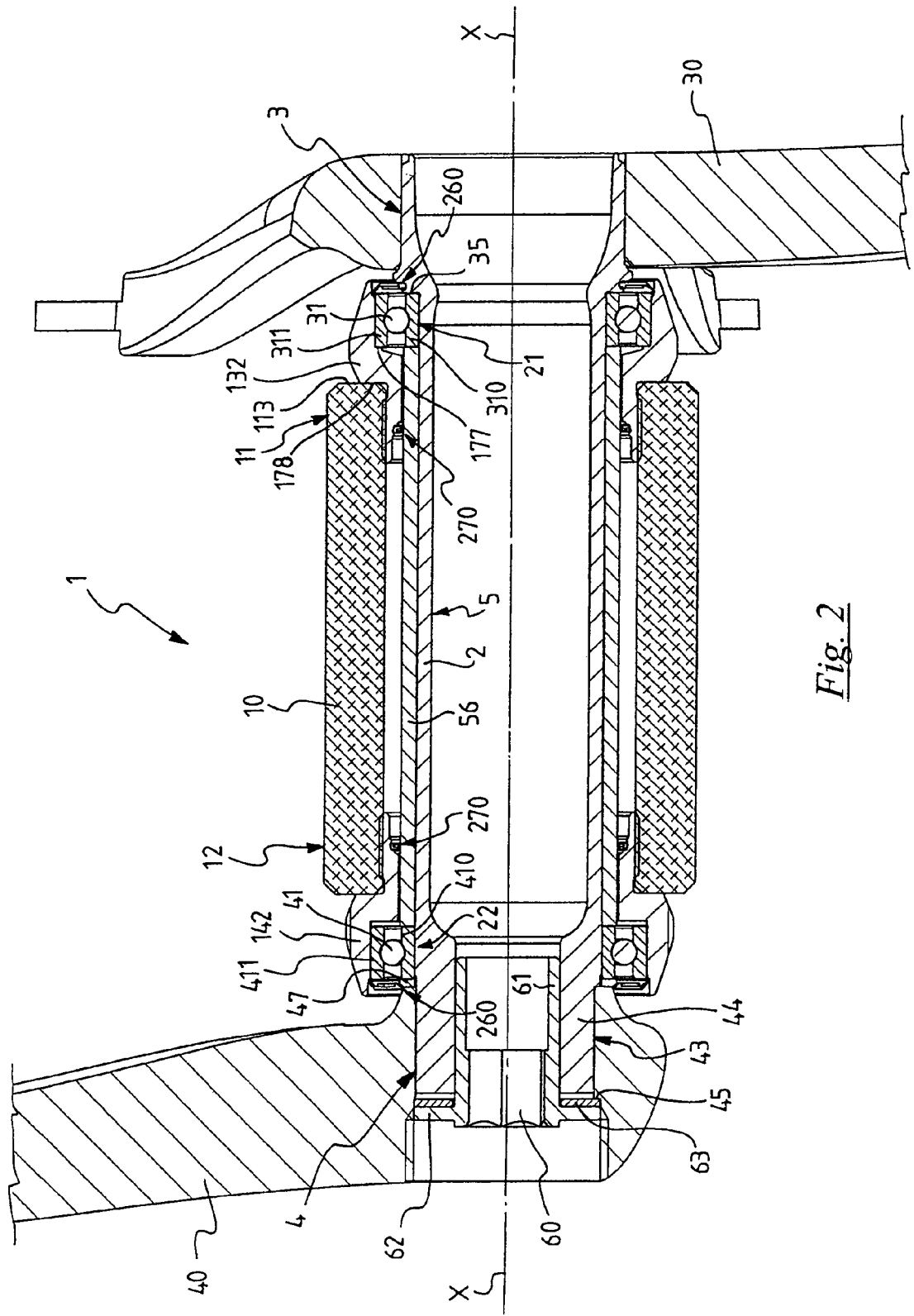
FIG. 2 is a schematic view in longitudinal section of a second embodiment of a bicycle bottom bracket assembly in accordance with the present invention.

FIG. 2 shows an alternative embodiment of the bottom bracket assembly 1 of the present invention. In such a figure, elements identical to those illustrated and described with reference to FIG. 1 are indicated with the same reference numeral, whereas corresponding elements are indicated with the same reference numerals increased by 100.

The bottom bracket assembly 1 of FIG. 2 differs from that of FIG. 1 in that it comprises adapters 132, 142 mounted cantilevered on the opposite ends 11, 12 of the housing box 10. The bearings 31, 41 are therefore housed outside the box 10.

In this case, unlike the embodiment of FIG. 1, between the outer rings 311, 411 there is no longer any outer spacer and the adapters 132 and 142 are designed and sized so that the left outer ring 411 of the left bearing 41 is still free to move in the two ways of the direction parallel to the axis X-X of the shaft 2, whereas the outer ring 311 of the right bearing 31 is free to move only towards the outside of the housing box 10. The right adapter 132 therefore comprises, also in this embodiment, an abutment surface 177 for preventing the outer ring 311 of the right bearing 31 from moving towards the inside of the box 10.

The locking of the outer ring 311 of the right bearing 31 in one of the two ways of the direction parallel to the axis X-X of the shaft 2 provides the reference for the positioning of the bottom bracket assembly in the box 10, whereas the freedom of movement of the outer ring 411 of the left bearing 41 in the two ways of the direction parallel to the axis X-X of the shaft 2 allows errors in size of the box 10 to be recovered, even if to a lesser degree with respect to the solution of FIG. 1.

The assembly of FIG. 2 also differs from that of FIG. 1 in that it does not use any spacer between the left crank arm 40 and the inner ring 410 of the left bearing 41 and between the inner ring 310 of the right bearing 31 and shoulder 35; on the other hand, a central spacer 56 between the inner rings of the two bearings is still used. Between the left crank arm 40 and the inner ring 410 of the left bearing 41 a washer 47 is arranged to better distribute the thrusting action exerted by the left crank arm 40 and to provide a cylindrical sliding surface for a seal for protecting the bearing, better described in greater detail below. Moreover, in this embodiment the right crank arm 30 is coupled with the right end portion 3 of the shaft 2 through a threaded coupling like the one described in European Patent Application No. 05026302 to the same applicant (which is the priority application to U.S. patent application Ser. No. 11/586,863, filed Oct. 26, 2006). However, alternative solutions are foreseen in which left and right spacers are used in a similar way to what is described with reference to FIG. 1. Alternative solutions are also foreseen in which the right crank arm 30 is coupled with the right end portion 3 of the shaft 2 through couplings of a type different to the threaded one, such as for example a grooved coupling or a coupling with square faces of the type described above with reference to FIG. 1.

Figure 3:
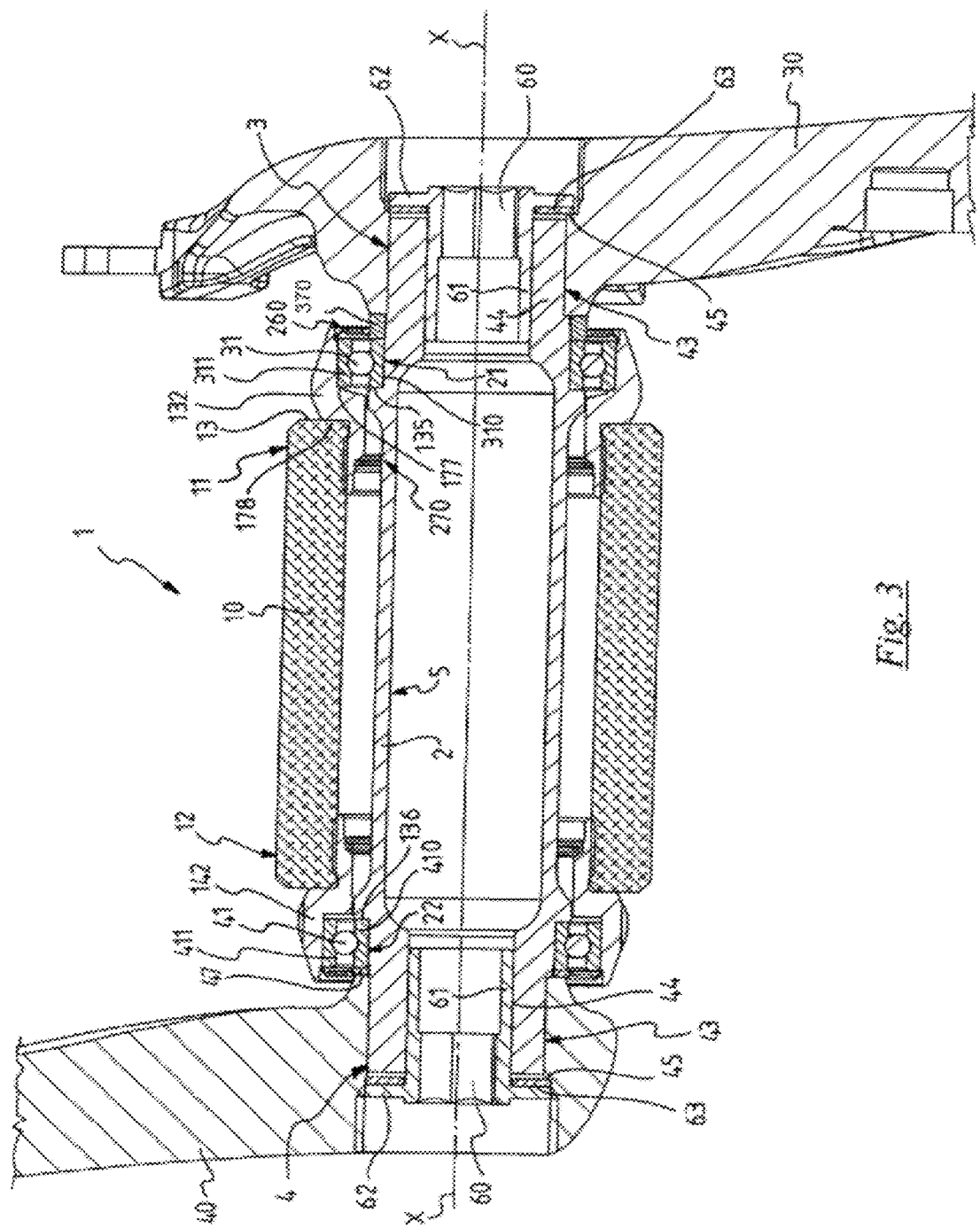
FIG. 3 is a schematic view in longitudinal section of a third embodiment of a bicycle bottom bracket assembly in accordance with the present invention.

FIG. 3 shows an alternative embodiment of the bottom bracket assembly 1 of the present invention. In such a figure, elements identical to those illustrated and described with reference to FIGS. 1 and 2 are indicated with the same reference numeral, whereas corresponding elements are indicated with the same reference numerals increased by 100.

The bottom bracket assembly 1 of FIG. 3 differs from that of FIG. 2 in that the central spacer between the inner rings 310, 410 of the two bearings 31, 41 is replaced by a pair of shoulders 135, 136 formed integrally on the shaft 2 at the respective free end portions 3 and 4. Moreover, in the assembly of FIG. 3 the right crank arm 30 is coupled with the respective end portion 3 of the shaft 2 in a similar way as the left crank arm 40, i.e., through a shape coupling of the type described above with reference to the left crank arm 40. In the illustrated embodiment, a right spacer 370 is positioned between the right crank arm 30 and the inner ring 310 of the right bearing 31. The spacer 370 can, however, not be provided, such that the body of the right crank arm 30 is directly in abutment against the right bearing 31.

In the assembly of FIG. 3, each bearing 31, 41 is inserted onto the shaft 2 from a respective end thereof and is thrust against the respective shoulder 135, 136 by a respective crank arm 30, 40.

Also in this case, alternative solutions are foreseen in which the right crank arm 30 is coupled with the end portion 3 of the shaft 2 through shape couplings of a type different to the grooved one, such as for example a threaded coupling or a coupling with square faces.

Figure 4:
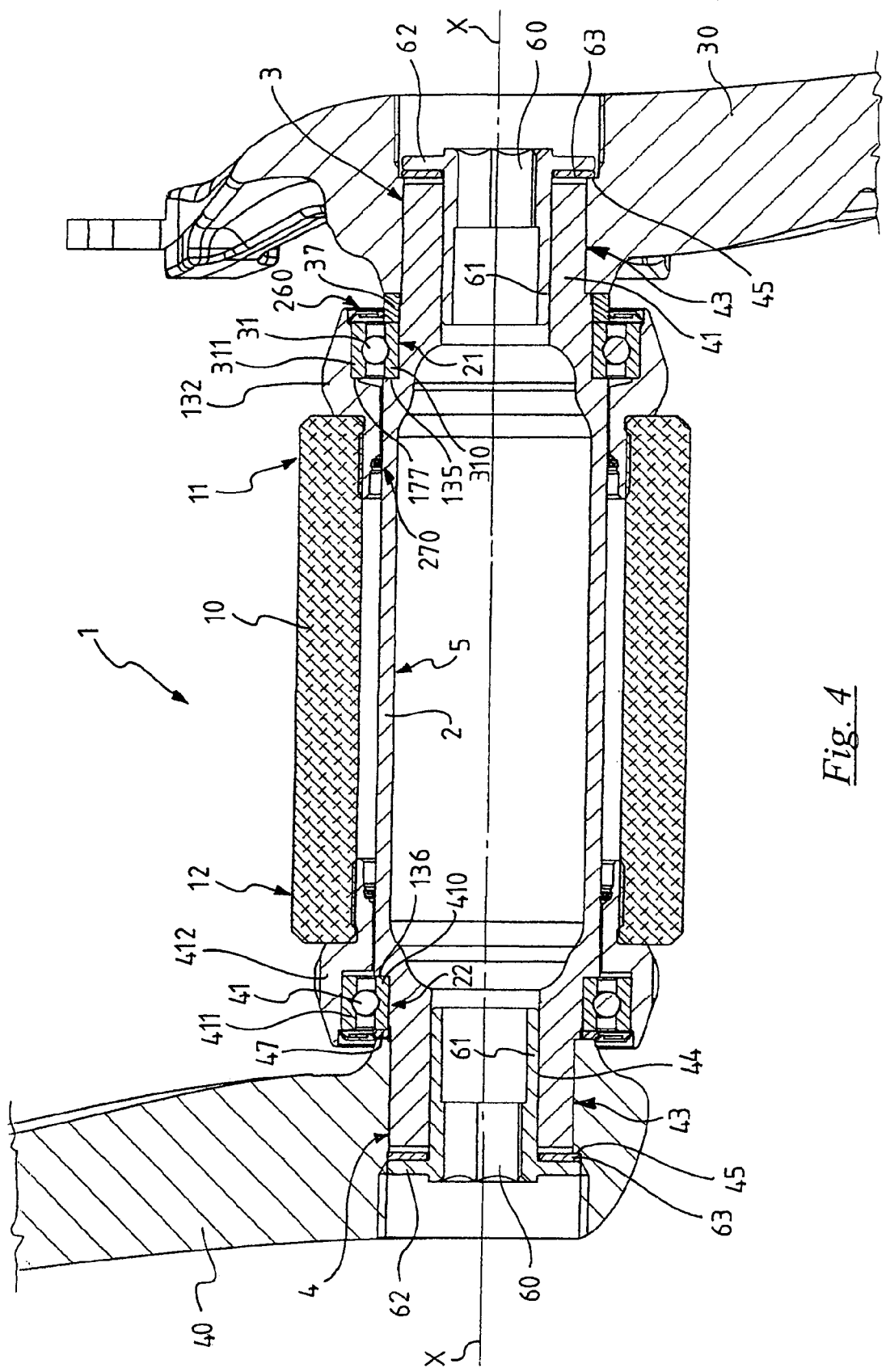
FIG. 4 is a schematic view in longitudinal section of a fourth embodiment of a bicycle bottom bracket assembly in accordance with the present invention.

FIG. 4 shows an alternative embodiment of the bottom bracket assembly 1 of the present invention.

The bottom bracket assembly 1 of FIG. 4 differs from that of FIG. 3 for the sole reason that the central portion 5 of the shaft 2 has a diameter greater than that of the end portions 3 and 4. In particular, the difference in diameter between the central portion 5 and the end portions 3 and 4 determines the shoulders 135 and 136 for locking the bearings 31, 41.

In the embodiments illustrated in FIGS. 2, 3 and 4, the assembly 1 comprises, at each bearing 31, 41, an outer seal 260 and an inner seal 270. The outer seal 260 insulates the bearings from the external environment, whereas the inner seal 270 insulates the bearings from the inside of the housing box 10 provided in the bicycle frame.

Figure 2B:
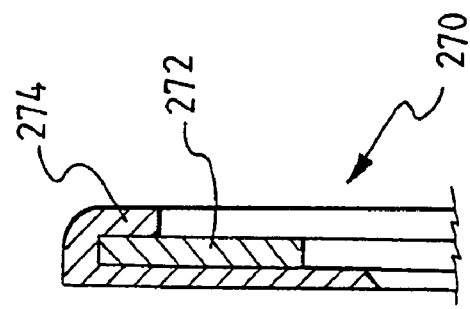
FIG. 2b is an enlarged view of a detail of the assembly of FIG. 2.
Figure 2A:
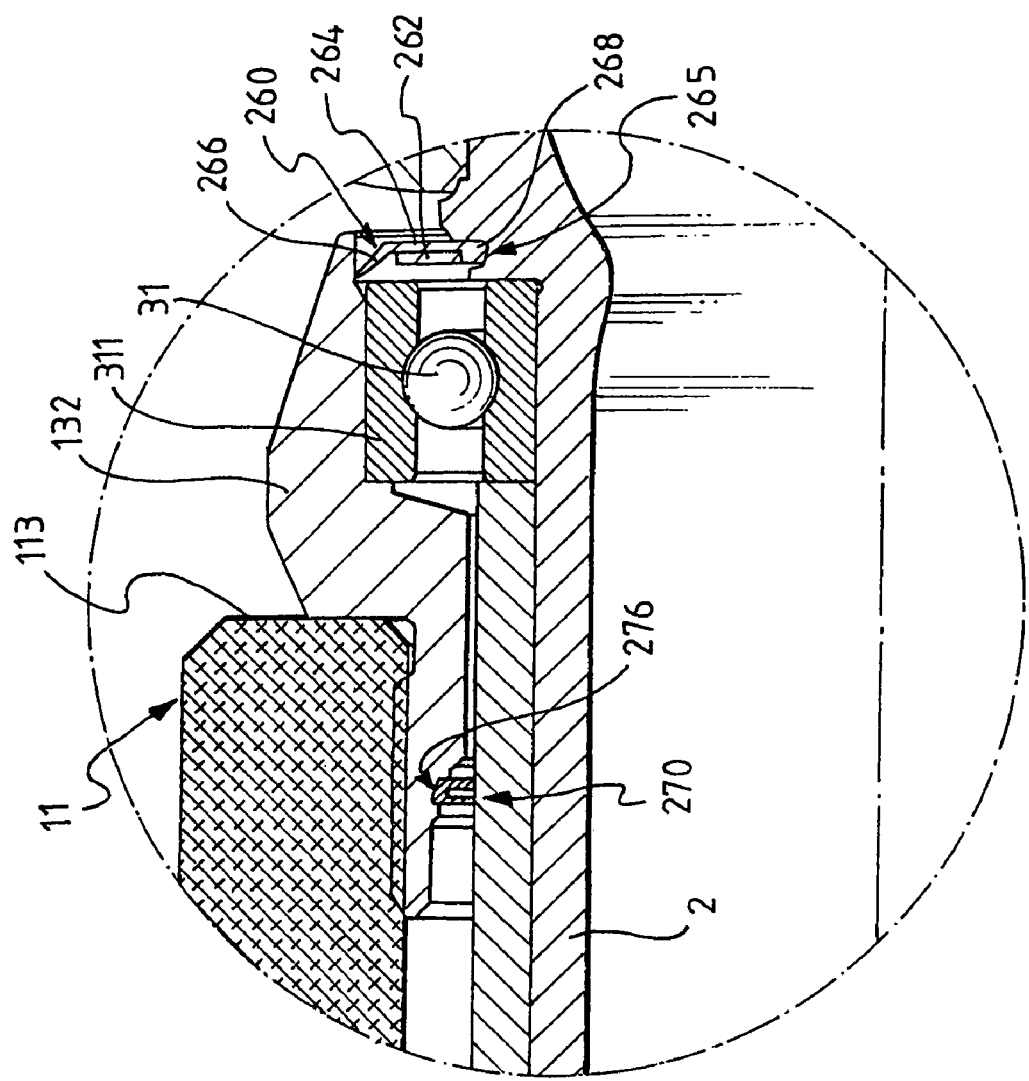
FIG. 2a is an enlarged view of a portion of the assembly of FIG. 2.

The seals are illustrated in detail in FIG. 2a, whereas FIG. 2b shows the section of one of such seals, in particular of the inner seal 270. The seals 260, 270 are described only with reference to the right end of the shaft 2, but what is stated is also valid for the left end of the shaft.

The seals 260 and 270 are arranged on axially opposite sides with respect to the bearing 31. The outer seal 260 comprises a rigid support ring 262, preferably metallic, coupled with an annular disc 264 made from elastic material. The disc 264 made from elastic material comprises, at the radial ends thereof, respectively, a fin 266, which overlaps outwardly the rigid ring 262, and a curb 268, which surrounds the inner radial surface of the disc 264. The fin 266 is in sliding contact with the inner surface of the adapter 132, whereas the curb 268 is inserted into an annular throat 265 formed on the shaft 2.

The inner seal 270, illustrated in the detail of FIG. 2b, also has a rigid support ring 272, preferably metallic, covered, at least partially, by an elastic sheath 274. The inner seal 270 is inserted in an annular throat 276 formed in the adapter 132, whereas the inner diameter thereof is slightly larger than the diameter of the shaft 2, preferably by one tenth, so as not to contact it and not to generate friction during rotation.

The seals 260 and 270 cooperate with the adapter 132 and with the shaft 2 to form a substantially watertight chamber inside which the bearing 31 is contained.

The outer seal 260 can, moreover, comprise an annular projection adapted to make contact with the front surface of the crank arm.

The shaft 2, advantageously, can consist of two cylindrical bodies of the same material arranged coaxially one inside the other. The outer cylindrical body can act as a spacer for the inner rings of the bearings.

Preferably, the crank arms 30, 40 of the bottom bracket assembly of the present invention, irrespective of the specific embodiment thereof, are made from metal material, such as aluminum alloys or other light alloys. Nevertheless, the possibility of making the crank arms from composite material is not excluded.

The composite material can in this case comprise structural fibers incorporated in a polymeric material. Typically, the structural fibers are selected from the group consisting of carbon fibers, glass fibers, aramid fibers, ceramic fibers, boron fibers and combinations thereof. Carbon fibers are particularly preferred.

The arrangement of the structural fibers in the polymeric material can be a random arrangement of blocks or small sheets of structural fibers, a substantially unidirectional ordered arrangement of fibers, a substantially bidirectional ordered arrangement of fibers, or a combination of the above.

Preferably, the polymeric material of the body of the crank arm is thermosetting and preferably comprises an epoxy resin. Nevertheless, the possibility of using a thermoplastic material is not excluded.

What is claimed is:

1. Bicycle bottom bracket assembly, comprising:
   a shaft having a longitudinal axis extending along a predetermined direction and comprising a first end portion and a second end portion;
   a first crank arm coupled with said first end portion of said shaft;
   a second crank arm coupled with said second end portion of said shaft;
   a first bearing having a first ring inserted on said shaft in a position adjacent to said first end portion and a second ring coupled with a first adapter adapted to be associated with a first end of a housing box of the bottom bracket assembly in a bicycle frame;
   a second bearing having a first ring inserted on said shaft in a position adjacent to said second end portion and a second ring coupled with a second adapter adapted to be associated with a second end of said housing box; and first locking means of said first rings of said first bearing and said second bearing acting on said first rings to prevent the movement of said first rings along said predetermined direction, wherein at least one adapter of said first adapter and said second adapter comprises a first abutment surface adapted to operate in abutment against a front end surface of said housing box and a second abutment surface adapted to operate in abutment against the second ring of at least one bearing between said first bearing and second bearing and wherein the second ring of the other bearing is free to move with respect to the other adapter in both ways of said predetermined direction, and wherein said first locking means includes a shoulder formed on said shaft and arranged between one of said first bearing and said second bearing and an adjacent one of said first crank arm and said second crank arm, said shoulder having an annular side wall that faces towards said one of said first bearing and said second bearing, wherein a first sealing element is arranged axially outwardly of one of said first bearing and second bearing and supported between a corresponding one of said first adapter and second adapter and said shaft, one end of said first sealing element being received in an annular throat formed on said shoulder of said shaft.

2. Bottom bracket assembly according to claim 1, wherein said first ring is the inner ring of the respective bearing and said second ring is the outer ring of the respective bearing.

3. Bottom bracket assembly, according to claim 1, wherein at least one of said first crank arm and said second crank arm is axially mobile with respect to said shaft along said predetermined direction and can be locked on the respective end portion of said shaft in a predetermined axial position in which said at least one of said first and second crank arms exerts an axial thrust on at least one of said first rings along said predetermined direction to lock at least one of said first bearing and said second bearing in axial position with respect to said shaft.

4. Bottom bracket assembly according to claim 3, wherein said first crank arm is coupled with said first end portion of said shaft through a first shape coupling that allows a relative movement between said first crank arm and said first end portion of said shaft along said predetermined direction.

5. Bottom bracket assembly according to claim 4, wherein said first shape coupling is a grooved coupling.

6. Bottom bracket assembly according to claim 5, wherein said grooved coupling comprises coupling elements extending parallel to said longitudinal axis.

7. Bottom bracket assembly according to claim 4, wherein said first shape coupling is a coupling with square faces.

8. Bottom bracket assembly according to claim 4, wherein said second crank arm is integrally formed with said shaft.

9. Bottom bracket assembly according to claim 4, wherein said second crank arm is associated with said shaft through a forced coupling with interference.

10. Bottom bracket assembly according to claim 1, wherein said adapters are adapted to be mounted cantilevered on said housing box.

11. Bottom bracket assembly according to claim 10, comprising second locking means of the second ring of said at least one bearing acting on said second ring to prevent the movement of said second ring along said predetermined direction towards the inside of said housing box.

12. Bottom bracket assembly according to claim 11, wherein said second locking means comprise an abutment surface for said second ring.

13. Bottom bracket assembly according to claim 1, wherein said shaft comprises a first layer of material and at least one second layer of material distinct from and lying over said first layer of material.

14. Bottom bracket assembly according to claim 13, wherein said first and at least one second layer are made from the same material.

15. Bottom bracket assembly according to claim 1, wherein the first sealing element is adapted to protect said one of the first bearing and second bearing from the external environment and further comprising at least one second sealing element that is adapted to protect said bearing from the inside of the housing box and operatively arranged between said corresponding one of the first adapter and second adapter and said shaft.

16. A bottom bracket assembly according to claim 1, wherein an entire end surface of each one of said first rings of said first bearing and second bearing is in direct contact with a central spacer arranged between said first and second bearings.

17. Bicycle crank arm assembly, comprising:
a shaft having a longitudinal axis extending along a predetermined direction and comprising at least one end portion for coupling with a crank arm;
at least one bearing having a first ring inserted on said shaft on at least one support portion of said shaft arranged adjacent to said at least one end portion; and
at least one crank arm arranged adjacent to said at least one support portion and comprising a hole for coupling with said end portion of said shaft, said hole having a longitudinal axis extending along said predetermined direction,
wherein said end portion of said shaft and said coupling hole comprise respective coupling profiles of matching shape, said coupling profiles being defined by respective coupling elements extending parallel to said longitudinal axis, and
said shaft having a shoulder arranged between said at least one support portion and said at least one crank arm, said shoulder having an annular side wall that faces towards said at least one support portion, said at least one bearing being arranged in contact with said annular wall of said shoulder, wherein a sealing element is arranged axially outwardly of said at least one bearing and includes an end received in an annular throat formed on said shoulder of said shaft.

18. Crank arm assembly according to claim 17, wherein said coupling profiles are grooved profiles and said coupling elements comprise a plurality of crests and a plurality of grooves formed on said end portion of said shaft and in said coupling hole of said crank arm.

19. Crank arm assembly according to claim 18, wherein said crests and grooves are defined by joined curved surfaces.

20. Crank arm assembly according to claim 18, wherein the grooves formed on the shaft comprise an axially tapered inner portion.

21. Bicycle bottom bracket assembly shaft, comprising:
a body having a longitudinal axis extending along a predetermined direction, said body having an end portion for coupling with a crank arm, said end portion of said shaft comprises a coupling profile defined by coupling elements extending parallel to said longitudinal axis;
wherein the body includes a support portion of said shaft arranged adjacent to said end portion that supports a bearing having a first ring inserted on said shaft at said support portion;

wherein said body includes a shoulder arranged between said support portion and said end portion, said shoulder having an annular side wall that faces towards said support portion, said bearing being arranged in contact with said annular side wall of said shoulder, and a sealing element is arranged axially outwardly of said bearing and includes an end received in an annular throat formed on said shoulder of said shaft.

22. Bicycle bottom bracket assembly shaft, comprising a first body having a longitudinal axis extending along a predetermined direction, said first body comprising a first layer of material having a first length along said predetermined direction and opposing end portions, wherein said first body further comprises at least one second layer of material distinct from and lying over said first layer of material, said at least one second layer of material having a second length along said predetermined direction that is less than said first length of said first layer of material and opposing axial ends, said second layer of material being arranged over an axial midpoint of said first layer of material and extending between first and second bearings each having a first ring inserted on said first layer of material adjacent to a respective one of said end portions, with each one of said axial ends in direct contact with a respective one of said first rings of said first and second bearings, wherein a sealing element is arranged axially outwardly of one of said first and second bearings and includes an end received in an annular throat formed on a shoulder that is formed on said first layer of material.

23. Shaft according to claim 22, wherein said first and at least one second layer are made from the same material.

24. Shaft according to claim 22, wherein said first body is substantially cylindrical and said at least one second layer of material defines at least one second substantially cylindrical body coaxially arranged outside said first body.

25. Bicycle bottom bracket assembly, comprising:
a shaft having a longitudinal axis extending along a predetermined direction;
at least one bearing inserted on an end portion of said shaft;
at least one crank arm coupled with said end portion of said shaft adjacent to said at least one bearing;
an adapter coupled with said at least one bearing and adapted to be associated with a housing box of the bottom bracket assembly provided in a bicycle frame;
a first seal adapted to protect said at least one bearing from the external environment and arranged axially outwardly of said at least one bearing and supported between said adapter and said shaft; and
a second seal adapted to protect said at least one bearing from the inside of the housing box and arranged axially inwardly of said at least one bearing and supported between said adapter and said shaft,
wherein said shaft includes a shoulder arranged between said at least one bearing and said at least one crank arm, said shoulder having an annular side wall that faces towards said at least one bearing, and said first seal having an end that is received in an annular throat formed on said shoulder of said shaft.

26. Bottom bracket assembly according to claim 25, wherein said first seal and said second seal are arranged on opposite sides with respect to said at least one bearing.

27. Bottom bracket assembly according to claim 25, wherein said first seal comprises a first rigid ring coupled with a first annular element made from elastic material.

28. Bottom bracket assembly according to claim 27, wherein said first annular element comprises a radially outer free end having a diameter smaller than a diameter of said adapter and a radially inner free end in contact with said shaft.

29. Bottom bracket assembly according to claim 28, wherein said radially inner free end of said first annular element is received in said annular throat formed on said shoulder of said shaft.

30. Bottom bracket assembly according to claim 29, wherein said first annular element comprises, at said radially outer free end, a fin that is placed on top of said first rigid ring and, at said radially inner free end, a curb, said first rigid ring being supported by said curb.

31. Bottom bracket assembly according to claim 25, wherein said second seal comprises a second rigid ring coupled with a second annular element made from elastic material.

32. Bottom bracket assembly according to claim 25, wherein said second annular element comprises a radially outer free end in contact with said adapter and a radially inner free end having a diameter greater than a diameter of said shaft.

33. Bottom bracket assembly according to claim 32, wherein a radially outer free end of said second annular element is housed in an annular seat formed on said adapter.

34. Bottom bracket assembly according to claim 31, wherein said second annular element comprises a sheath that, at the radially outer free end of said second annular element, at least partially covers said second rigid ring.

35. A bicycle bottom bracket assembly, comprising:
a shaft having a longitudinal axis extending along a predetermined direction and comprising a first end portion, and a second end portion;
a first bearing having a first ring inserted on said shaft in a position adjacent to said first end portion and a second ring coupled with a first adapter adapted to be associated with a first end of a housing box of the bottom bracket assembly in a bicycle frame;
a second bearing having a first ring inserted on said shaft in a position adjacent to said second end portion and a second ring coupled with a second adapter adapted to be associated with a second end of said housing box;
a first abutment element of said first rings of said first bearing and said second bearing acting on said first rings to prevent the movement of said first rings along said predetermined direction;
a first crank arm coupled with said first end portion of said shaft; and
a second crank arm coupled with said second end portion of said shaft,
wherein at least one adapter of said first adapter and said second adapter comprises a first abutment surface adapted to operate in abutment against a front end surface of said housing box and a second abutment surface adapted to operate in abutment against the second ring of at least one bearing between said first bearing and said second bearing and wherein the second ring of the other bearing is free to move with respect to the other adapter in both ways of said predetermined direction,
said first abutment element including a shoulder formed on said shaft and arranged between one of said first bearing and said second bearing and an adjacent one of said first crank arm and said second crank arm, said shoulder having an annular side wall that faces towards said one of said first bearing and said second bearing, wherein a sealing element is arranged axially outwardly of one of said first bearing and second bearing and supported between a corresponding one of said first adapter and second adapter and said shaft, one end of said sealing element being received in an annular throat formed on said shoulder of said shaft;

at least one of said first crank arm and said second crank arm is axially mobile with respect to said shaft along said predetermined direction and can be locked on the respective end portion of said shaft in a predetermined axial position in which said at least one of said first crank arm and said second crank arm exerts an axial thrust on at least one of said first rings along said predetermined direction to lock at least one of said first bearing and said second bearing in axial position with respect to said shaft, and said first crank arm is coupled with said first end portion of said shaft through a first shape coupling that allows a relative movement between said first crank arm and said first end portion of said shaft along said predetermined direction.

36. A bottom bracket assembly according to claim 35, wherein said first abutment element is fixed with respect to the shaft and acts on at least one of said first rings on the opposite side to said first crank arm to lock said at least one of said first rings in axial position on said shaft, a first spacer is inserted on said shaft between said first bearing and said second bearing and acts in abutment on the first rings of said first bearing and said second bearing, and said first abutment element is defined at said second end portion of shaft and acts on the first ring of said second bearing on the opposite side to said first spacer to lock the first rings of said first bearing and said second bearing in axial position on said shaft.

37. A bottom bracket assembly according to claim 35, wherein said second crank arm is associated with said shaft through a forced coupling with interference.

38. A bicycle bottom bracket assembly, comprising:
a shaft having a predetermined longitudinal axis, a first end portion, and a second end portion;
a first crank arm;
a first coupling that couples said first crank arm with said first end portion and allows relative movement between said first crank arm and said first end portion along said predetermined longitudinal axis of said shaft;
a second crank arm coupled with said second end portion of said shaft; and
a first bearing and a second bearing inserted on said first end portion and said second end portion of said shaft, respectively,
wherein said shaft includes a shoulder arranged between said second bearing and said second crank arm, said shoulder having an annular side wall that faces towards said second bearing, and a sealing element is arranged axially outwardly of said second bearing and includes an end received in an annular throat formed on said shoulder of said shaft.

39. A bottom bracket assembly according to claim 38, wherein said second crank arm is associated with said shaft through a forced coupling with interference.

40. A bicycle bottom bracket assembly, comprising:
a shaft having a predetermined longitudinal axis, a first end portion, and a second end portion;
at least one crank arm;
at least one bearing arranged on said shaft adjacent to said at least one crank arm to rotatably support a housing on said shaft; and,
a coupling that couples said at least one crank arm to said first end portion and allows relative movement along said predetermined longitudinal axis of said shaft between said crank arm and said first end portion,
wherein said shaft includes a shoulder arranged between said at least one bearing and said at least one crank arm, said shoulder having an annular wall that faces towards said at least one bearing, and a sealing element is arranged axially outwardly of said at least one bearing and includes an end received in an annular throat formed on said shoulder of said shaft.

41. A bottom bracket assembly according to claim 40, wherein said at least one crank arm is associated with said shaft through a forced coupling with interference.

* * * * *

UNITED STATES PATENT AND TRADEMARK OFFICE
CERTIFICATE OF CORRECTION

PATENT NO. : 8,302,504 B2  
APPLICATION NO. : 11/704861  
DATED : November 6, 2012  
INVENTOR(S) : Giuseppe Dal Prà

Page 1 of 1

It is certified that error appears in the above-identified patent and that said Letters Patent is hereby corrected as shown below:

Title Page, Item (12), under "United States Patent", delete "Dal Pra'" and insert therefor
--Dal Prà--.

Title Page, Item (75), after the word "Inventor:", delete "Giuseppe Dal Pra'" and insert therefor
--Giuseppe Dal Prà--.

Signed and Sealed this
Twelfth Day of March, 2013

Teresa Stanek Rea
*Acting Director of the United States Patent and Trademark Office*